(12) United States Patent
McCann

(10) Patent No.: US 9,975,426 B2
(45) Date of Patent: May 22, 2018

(54) ENERGY EFFICIENT ELECTRIC VEHICLE CONTROL SYSTEM

(71) Applicant: Parker Hannifin Manufacturing Limited, Crewkerne (GB)

(72) Inventor: Thomas McCann, Crewkerne (GB)

(73) Assignee: PARKER-HANNIFIN MANUFACTURING LIMITED, Crewkerne (GB)

( * ) Notice: Subject to any disclaimer, the term of this patent is extended or adjusted under 35 U.S.C. 154(b) by 0 days. days.

(21) Appl. No.: 14/901,299

(22) PCT Filed: Jun. 26, 2014

(86) PCT No.: PCT/GB2014/051959
§ 371 (c)(1),
(2) Date: Dec. 28, 2015

(87) PCT Pub. No.: WO2014/207474
PCT Pub. Date: Dec. 31, 2014

(65) Prior Publication Data
US 2016/0152138 A1    Jun. 2, 2016

Related U.S. Application Data

(60) Provisional application No. 61/839,610, filed on Jun. 26, 2013.

(51) Int. Cl.
*B60K 17/10* (2006.01)
*B60K 25/10* (2006.01)
(Continued)

(52) U.S. Cl.
CPC .............. *B60K 25/10* (2013.01); *B60K 1/02* (2013.01); *B60K 6/12* (2013.01);
(Continued)

(58) Field of Classification Search
CPC ........... B60K 6/12; B60K 6/123; B60K 6/126
(Continued)

(56) References Cited

U.S. PATENT DOCUMENTS 3,990,235 A * 11/1976 Bauchet ................... B60K 6/12
60/413
5,495,912 A *  3/1996 Gray, Jr. .................. B60K 6/12
180/165
(Continued)

FOREIGN PATENT DOCUMENTS

CH           679384      2/1992
EP         1046610 A    10/2000
(Continued)

OTHER PUBLICATIONS

International Preliminary Report on Patentability from corresponding International Application No. PCT/GB2014/051959, dated Dec. 29, 2015.

*Primary Examiner* — Jeffrey J Restifo
(74) *Attorney, Agent, or Firm* — Renner, Otto, Boisselle & Sklar, LLP.

(57) ABSTRACT

An electric vehicle comprises an electrical system and a hydraulic system. The electrical system comprises an electric power supply and an electric motor-generator connected to the drive train of the vehicle. The hydraulic system includes a pump, and a hydraulic actuator. At least one of the electrical system and the hydraulic system includes energy recovery means arranged to convert kinetic energy from the drive train to electrical energy or to convert kinetic energy from the hydraulic actuator into hydraulic pressure respectively. The electrical and hydraulic systems are connected such that the recovered energy may be converted from electrical to hydraulic energy and/or vice versa. The hydraulic system may further include a hydraulic accumulator.

14 Claims, 4 Drawing Sheets

(51) Int. Cl.
  *B60K 1/02* (2006.01)
  *B60K 6/12* (2006.01)
  *B60W 30/18* (2012.01)

(52) U.S. Cl.
  CPC . *B60W 30/18127* (2013.01); *B60K 2025/106* (2013.01); *B60W 2300/12* (2013.01); *B60W 2300/121* (2013.01); *B60W 2300/15* (2013.01); *B60W 2300/17* (2013.01); *Y02T 10/6208* (2013.01); *Y02T 10/92* (2013.01)

(58) Field of Classification Search
  USPC .................................. 180/305, 306, 307, 308
  See application file for complete search history.

(56) References Cited

U.S. PATENT DOCUMENTS

| | | | |
|---|---|---|---|
| 5,505,527 A * | 4/1996 | Gray, Jr. | B60K 6/00 180/165 |
| 5,697,679 A * | 12/1997 | Sakaguchi | G06F 11/0757 303/122.06 |
| 7,181,910 B2 | 2/2007 | Nissen et al. | |
| 7,654,354 B1 * | 2/2010 | Otterstrom | B60K 6/12 180/165 |
| 9,512,596 B2 | 12/2016 | Kang et al. | |
| 2004/0003589 A1 | 1/2004 | Johansson et al. | |
| 2006/0243260 A1 | 11/2006 | Ichijo et al. | |
| 2007/0161456 A1 | 7/2007 | Kato et al. | |
| 2008/0041047 A1 | 2/2008 | Kato | |
| 2008/0060860 A1 | 3/2008 | Murase et al. | |
| 2008/0121448 A1 * | 5/2008 | Betz | B60K 6/12 180/65.31 |
| 2008/0190703 A1 | 8/2008 | Kato et al. | |
| 2008/0201044 A1 | 8/2008 | Yamada et al. | |
| 2008/0251302 A1 * | 10/2008 | Lynn | B60K 6/12 180/65.25 |
| 2008/0314664 A1 * | 12/2008 | Mueller | B60K 6/12 180/165 |
| 2009/0008183 A1 * | 1/2009 | Kawamura | F04B 1/22 180/307 |
| 2009/0062060 A1 * | 3/2009 | Rink | B60K 6/12 477/4 |
| 2009/0139788 A1 * | 6/2009 | Miller | B60K 6/12 180/165 |
| 2009/0236182 A1 | 9/2009 | Yamagami | |
| 2009/0270221 A1 * | 10/2009 | Kovach | B60K 6/12 477/3 |
| 2009/0283346 A1 | 11/2009 | Katae et al. | |
| 2010/0151989 A1 * | 6/2010 | Read | B60K 6/12 477/4 |
| 2010/0186404 A1 | 7/2010 | Yasufuku et al. | |
| 2011/0112712 A1 | 5/2011 | Koide et al. | |
| 2011/0118922 A1 | 5/2011 | Koide et al. | |
| 2011/0137502 A1 | 6/2011 | Kato et al. | |
| 2012/0130576 A1 * | 5/2012 | Sugiyama | B60K 6/12 701/22 |
| 2012/0240564 A1 * | 9/2012 | Wesolowski | B60K 6/12 60/327 |
| 2012/0253610 A1 * | 10/2012 | Anders | E02F 9/2091 701/50 |
| 2013/0004281 A1 * | 1/2013 | Anders | E02F 9/2075 414/687 |
| 2013/0006457 A1 * | 1/2013 | Anders | E02F 9/2075 701/22 |
| 2013/0240068 A1 * | 9/2013 | Samara-Rubio | F15B 1/24 137/571 |
| 2014/0087916 A1 * | 3/2014 | Johnson | B60K 6/12 477/2 |
| 2015/0013324 A1 | 1/2015 | Matsuo et al. | |
| 2015/0039172 A1 * | 2/2015 | Song | B60W 20/00 701/22 |
| 2016/0002889 A1 * | 1/2016 | Kajita | F15B 21/14 701/50 |
| 2016/0037722 A1 * | 2/2016 | Missotten | B60K 6/12 701/48 |
| 2016/0152138 A1 * | 6/2016 | McCann | B60K 25/10 180/165 |
| 2016/0160470 A1 * | 6/2016 | Kishimoto | B60L 1/003 475/5 |
| 2016/0160471 A1 * | 6/2016 | Kishimoto | E02F 9/2079 701/22 |
| 2016/0200199 A1 * | 7/2016 | Nakata | B60T 1/10 303/3 |
| 2016/0200200 A1 * | 7/2016 | Nakata | B60W 10/184 303/3 |
| 2016/0221448 A1 * | 8/2016 | Pritchard | B60L 7/24 |
| 2017/0067489 A1 * | 3/2017 | Versteyhe | F15B 1/033 |

FOREIGN PATENT DOCUMENTS

| | | |
|---|---|---|
| EP | 1193211 A2 | 9/2001 |
| EP | 1593645 A | 11/2005 |
| EP | 3178778 A1 | 6/2017 |
| GB | 2360757 B | 3/2004 |
| JP | 2008297031 A | 12/2008 |
| JP | 2009062110 A | 3/2009 |
| JP | 5831263 B2 | 12/2015 |
| SE | 457072 B | 11/1988 |
| WO | 9847732 | 10/1998 |
| WO | 2011/148051 A1 | 12/2011 |

* cited by examiner

ENERGY EFFICIENT ELECTRIC VEHICLE CONTROL SYSTEM

This application is a national phase of International Application No. PCT/GB2014/051959 filed Jun. 26, 2014 and published in the English language, and claims priority to U.S. Provisional Application No. 61/839,610 filed Jun. 26, 2013, each of which are herein incorporated by reference in their entirety.

The invention relates generally to a method and system for recovering the energy generated by a work vehicle such as an electric forklift truck, electric order picker or the like, in which energy from a braking action or a lowering of the lift is either stored or immediately utilized, and when stored, the energy is utilized during an acceleration of the vehicle or a lifting of a load.

Work vehicles such as electric fork lift trucks or electric order pickers include an electrical drive means for providing motion to the vehicle. They also include a separate hydraulic system for providing power to hydraulic actuators such as in the lifting circuit of a fork lift. It is known to utilize an electric motor-generator to create a regenerative braking system wherein the kinetic energy of the vehicle under braking is converted to electrical energy that is used to charge the battery. It is also known to store the hydraulic power generated by the actuators on load lowering using a hydraulic accumulator, with the pressurized fluid from the accumulator being used on demand to assist in load lifting. However, it has been identified that neither of these systems makes the most efficient use of the recovered energy.

It is therefore desirable to provide an improved vehicle system that makes more efficient use of recovered energy, and or which provides improvements generally.

In an embodiment of the present invention there is provided a vehicle comprising an electrical system comprising an electric power supply and an electric motor-generator connected to the drive train of the vehicle, and a hydraulic system including a pump, and a hydraulic actuator. At least one of the electrical system and the hydraulic system includes energy recovery means arranged to convert kinetic energy from the drive train to electrical energy or to convert kinetic energy from the hydraulic actuator into hydraulic pressure respectively, the electrical and hydraulic systems being connected such that the recovered energy may be converted from electrical to hydraulic energy and/or vice versa. The hydraulic system may further include a hydraulic accumulator.

Preferably both the electrical system and the hydraulic system includes energy recovery means arranged to convert kinetic energy from the drive train to electrical energy and to convert kinetic energy from the hydraulic actuator into hydraulic pressure respectively. The electrical and hydraulic systems are connected such that the recovered energy may be converted from electrical to hydraulic energy and vice versa. In this way, it is possible to convert recovered electric energy to hydraulic energy for storage, and to convert the hydraulic energy to electrical energy to charge the battery under optimized current conditions through control of the let down from the accumulator, and/or to use the electrical energy converted from the accumulator to power the drive motor. Alternatively the electrical braking energy may be used in real time to power the pump for hydraulic lifting. Similarly hydraulic kinetic energy may be converted to electrical energy on recovery for immediate real time use in driving the vehicle.

The electric motor-generator is preferably arranged to convert kinetic energy from the drive train to electrical energy and is connected to the hydraulic system such that the recovered electrical energy may be converted to hydraulic power via the pump and stored in the hydraulic accumulator.

The electrical power supply is preferably a battery and the recovered electrical energy may be selectively used to charge the battery and/or converted to hydraulic power and stored in the accumulator.

The hydraulic system may include a motor-generator connected to the pump and arranged such that hydraulic power stored in the accumulator may be converted to electrical energy.

The electrical energy generated from the stored hydraulic accumulator may be selectively directed to the motor-generator to provide motion to the drive train and/or to charge the battery. This selective use of the energy enables the recovered energy to be directed in eth most efficient manner depending on the instantaneous power demands of the vehicle.

The vehicle may also include an inverter drive connected to the motor-generator of the hydraulic system.

The vehicle may also include an inverter drive connected to the motor-generator of the electrical system.

A vehicle according to any preceding claim wherein the motor-generator of the electrical system is connected to a traction drive, and is configured to apply a braking force to the vehicle and to convert the kinetic energy generated during said braking to electrical energy.

In another aspect of the present invention there is provided a lift truck or other vehicle comprising: a battery; an inverter drive electrically connected to the battery and connected to a first motor/generator, a traction drive/brake coupled to the first motor/generator; a second inverter drive electrically connected to the battery and connected to a second motor/generator; and a hydraulic pump/motor coupled to the second motor/generator and hydraulically connected to a hydraulic lift circuit including a hydraulic actuator and a hydraulic accumulator; wherein kinetic energy from the traction drive/brake is converted to electrical energy and selectively stored in the battery or converted into hydraulic power and selectively stored in an accumulator or used to actuate the hydraulic actuator; wherein kinetic energy from actuation of the hydraulic actuator is converted to hydraulic power and selectively stored in the accumulator or converted into electrical power and selectively stored in the battery or converted into torque to move the lift truck.

In another aspect of the present invention there is provided a work machine comprising: a battery; a first inverter drive electrically connected to the battery and connected to a first motor/generator; a traction drive coupled to the first motor/generator; a second inverter drive electrically connected to the battery and connected to a second motor/generator; a hydraulic pump/motor coupled to the second motor/generator and hydraulically connected to a hydraulic lift circuit including a hydraulic actuator and a hydraulic accumulator; the traction drive selectively driving the first motor/generator; the first motor/generator selectively driving the traction drive; the second motor/generator selectively driving the hydraulic pump/motor; the hydraulic pump/motor selectively driving the second motor/generator; the hydraulic actuator selectively driving the hydraulic pump/motor; the accumulator adapted to receive and store hydraulic pressure from the hydraulic pump/motor or from the hydraulic actuator and to selectively provide hydraulic pressure to the hydraulic actuator or to the hydraulic pump/motor; and the battery adapted to selectively receive and store electric power from at least one of the motor/generators through at least one of the inverter drives and to selectively provide electric power to at least one of the motor/generators through at least one of the inverter drives.

In another aspect of the present invention there is provided a method of operating the work machine described in the preceding paragraph comprising the steps of: moving the vehicle by the traction drive by selectively utilizing power from the battery, the accumulator, or the hydraulic actuator, alone or in any combination; operating the hydraulic actuator by selectively utilizing power from the battery, the accumulator, or the traction drive, alone or in any combination.

In another aspect of the present invention there is provided a work machine comprising: a battery; an inverter drive electrically connected to the battery and connected to a motor/generator; a traction drive/brake coupled to the motor/generator; a hydraulic pump/motor coupled to the motor/generator and hydraulically connected to a hydraulic circuit including a hydraulic actuator and a hydraulic accumulator; the traction drive selectively driving the motor/generator; the motor/generator selectively driving the traction drive; the motor/generator selectively driving the hydraulic pump/motor; the hydraulic pump/motor selectively driving the motor; the hydraulic actuator selectively driving the hydraulic pump/motor; the accumulator adapted to receive and store hydraulic pressure from the pump/motor or from the hydraulic actuator and to selectively provide hydraulic pressure to the hydraulic actuator or to the hydraulic pump/motor; and the battery adapted to selectively receive and store electric power from the motor/generators through the inverter drive and to selectively provide electric power to the motor/generators through the inverter drive.

In another aspect of the present invention there is provided a work machine comprising: a battery; an inverter drive electrically connected to the battery and connected to a motor/generator; the battery adapted to selectively receive and store electric power from the motor/generator through the inverter drive and to selectively provide electric power to the motor/generator through the inverter drive; a first hydraulic pump/motor coupled to the motor/generator and hydraulically connected to a hydraulic circuit including a hydraulic actuator, a second hydraulic pump/motor, and a hydraulic accumulator; the second hydraulic pump/motor coupled a traction drive/brake; the motor/generator selectively driving the first hydraulic pump/motor; the first hydraulic pump/motor selectively driving the motor/generator; the traction drive selectively driving the second hydraulic pump/motor; the second hydraulic pump/motor selectively driving the traction drive; the first hydraulic pump/motor selectively driving the second hydraulic pump/motor or providing hydraulic pressure to the hydraulic actuator; the second hydraulic pump/motor selectively driving the first hydraulic pump/motor or providing hydraulic pressure to the hydraulic actuator; the hydraulic actuator selectively driving the first hydraulic pump/motor or the second hydraulic pump/motor; and the accumulator adapted to receive and store hydraulic pressure from the first hydraulic pump/motor, the second hydraulic pump/motor, or from the hydraulic actuator and to selectively provide hydraulic pressure to the hydraulic actuator or to the first hydraulic pump/motor or to the second hydraulic pump/motor.

The present invention will now be described by way of example only with reference to the following illustrative figures in which.

Figure 1:
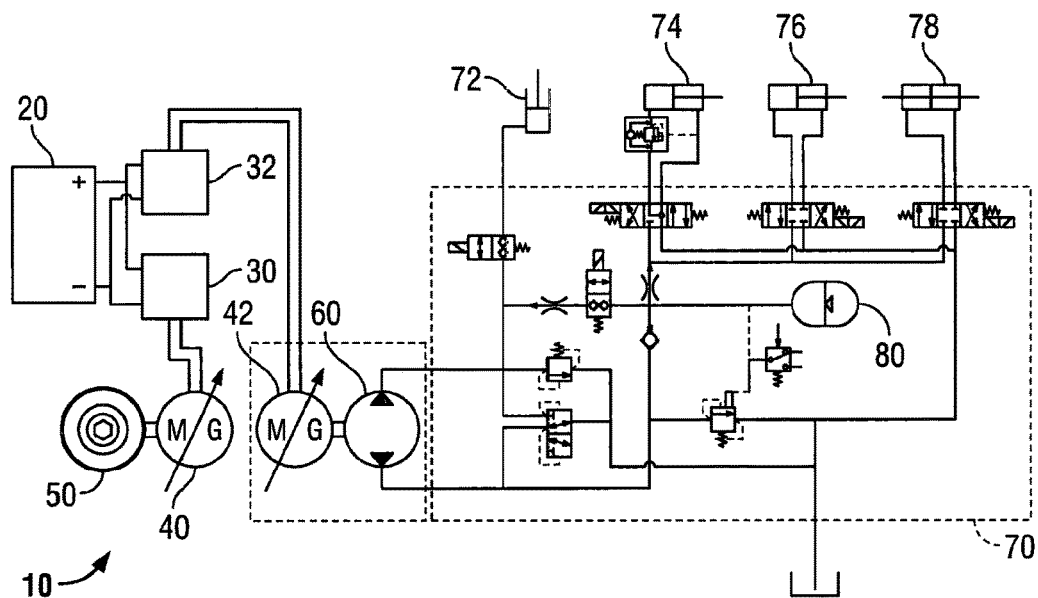
FIG. 1 is a schematic of a first embodiment of a system constructed in accordance with the present invention utilizing a first motor/generator to drive the traction drive/brake and a second motor/generator for the hydraulic pump/motor.

Referring now to FIG. 1, a schematic for a work vehicle such as a lift truck or fork lift. The system 10 comprises a battery 20 electrically connected to a first inverter drive 30 which is electrically connected to a first motor/generator 40 and a second inverter drive 32 which is electrically connected to a second motor/generator 42. The first motor/generator 40 is mechanically connected to the traction drive/brake 50 or wheel of system 10. The second motor/generator 42 is mechanically connected to a hydraulic pump/motor 60 which is connected to a hydraulic circuit 70 which includes a plurality of valves for the operation of cylinders to operate the functions of the lift truck. These functions include the raising and lowering of the lift, and also the tilt, reach, and side shift. The circuit 70 also includes an accumulator 80 which is selectively connected to the pump/motor 60, lift cylinder 72, and other cylinders 74, 76, 78 which operate the function of the lift.

The battery 20 is typically a DC battery which is electrically connected to provide and receive DC power to and from the inverter drives 30, 32. The inverter drives 30, 32 are electrically connected to each other via a common bus 34, which enables the inverter drives 30, 32 to pass electric power from one to the other, enabling the power to bypass the battery 20 for either immediate use or storage in the accumulator 80. The inverter drives 30, 32 are electrically connected to provide and receive AC power to and from the motor/generators 40, 42, which operate both as motors and generators. The first motor/generator 40 is mechanically connected to the traction drive/brake 50 which operates as a traction drive during acceleration of the work vehicle and as a traction brake during deceleration of the vehicle. The second motor/generator 42 is connected to the hydraulic pump/motor 60 which operates as a pump when charging the accumulator 80 or powering the hydraulic cylinders 72, 74, 76, 78 and as a motor when hydraulic pressure from the hydraulic accumulator 80 or from the hydraulic lift cylinder 72 is used to power the traction drive 50 or to provide power for storage in the battery 20. The motor/generators 40, 42 are variable speed drives. The inverter drives 30, 32 are PMAC drives or other appropriate inverter drives.

The operation of the system is as follows:

In "stand by" mode, the second motor/generator 42 is run off of the battery 20 at an optimum speed and torque to turn the hydraulic pump/motor 60 to charge the accumulator 80.

In "accelerating drive" mode, the motor/generator 40 will take power from the battery 20, the motor drive operation can be assisted by running the motor/generator 42 using flow from the accumulator 80 to drive the hydraulic pump/motor 60 with electrical power transfer direct through the common bus 34 (not back to the battery).

In "decelerating drive" mode, the first motor/generator 40 will create power as a generator, this power can go back to the battery 20, or it can be more efficiently routed to the second motor/generator 42 to charge the accumulator 80 as required.

In "lift" mode, the accumulator 80 is used for fast movement of the hydraulic actuator 72 with motor 42 assist as required. Precision movements may be made with the motor/generator 42 only. Power for the lift actuator 72 is also available from battery 20, and power from motor/generator 40 may also be used if available (during braking).

In "lower" mode—the speed is set by the motor/generator 42, by the load motor if accumulator needs charge, and to generate electricity if the accumulator 80 is fully charged. Regenerative power from lowering the lift actuator 72 is available to the accumulator 80, traction motor 40, or battery 20 (the battery being lowest efficiency regeneration).

Auxiliary functions 74, 76, 78 are powered by accumulator 80 with motor/generator 42 assist as required.

The intention is to run the motor/generators 40, 42 in their optimum power/torque mode, and regenerate as much brake or lowering energy as possible. It's more efficient to transfer recovered electrical power to the opposite motor/generator, than back into the battery 20.

For example during deceleration the traction motor/generator 40 can create electrical power, which is used to drive the motor/generator 42 and charge the accumulator 80 during transport mode. Running the motor/generator 42 during transport mode will help balance out the peak demands. Acceleration and lifting can be boosted by the accumulator 80 that has been charged during less demanding parts of the machine cycle.

Figure 2:
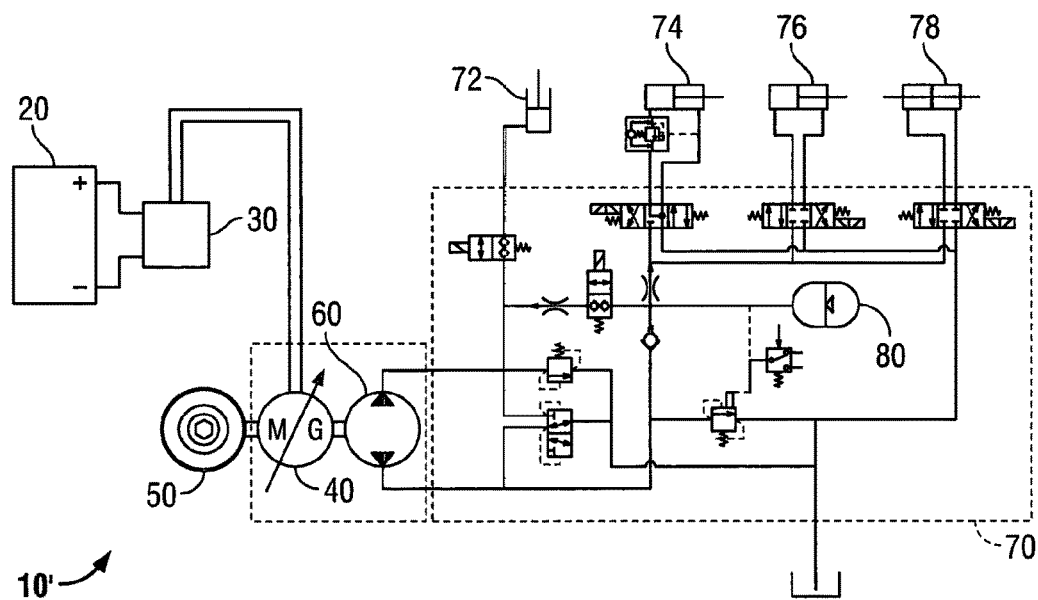
FIG. 2 illustrates a second exemplary schematic embodiment of a system constructed in accordance with the present invention—the system utilizing a single motor/generator to drive the traction drive/brake and the hydraulic pump/motor.

In a second embodiment shown in FIG. 2, a schematic shows one motor/generator 40 to drive and be driven by both the traction drive/brake 50 and the hydraulic pump/motor 60. Accordingly, the system 10' utilizes a single inverter drive 30 between the battery 20 and the motor/generator 40. The second embodiment is otherwise similar to the first embodiment, but with a significant reduction in component cost. Some simultaneous operations will need to be compromised, but this will be compared to the cost reduction trade off.

Figure 3:
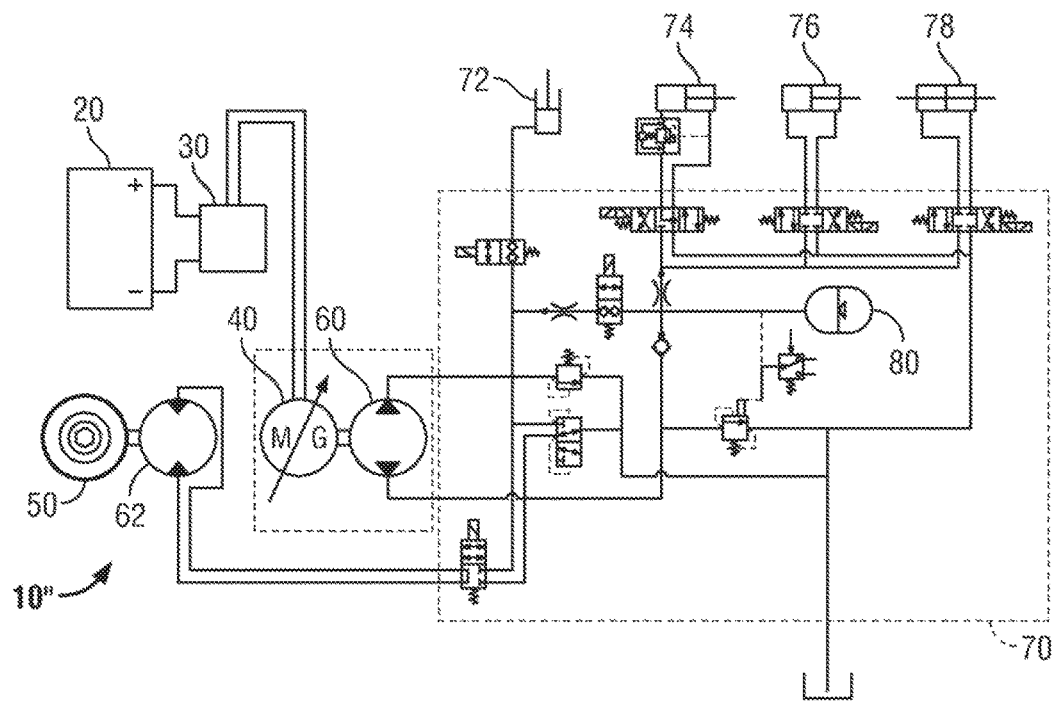
FIG. 3 illustrates a third exemplary schematic embodiment of a system constructed in accordance with the present invention—the system utilizing a single motor/generator and at least two hydraulic pump/motors.

In a third embodiment shown in FIG. 3, a schematic shows one motor/generator 40 to drive and be driven by both a first hydraulic pump/motor 60 and a second hydraulic pump/motor 62 which is coupled to the traction drive/brake 50. The second pump/motor 62 and the first pump motor 60 are selectively connected by the hydraulic circuit 70 to each other and to the hydraulic actuator 72, and the hydraulic accumulator 80. Accordingly, the system 10" utilizes a single inverter drive 30 between the battery 20 and the motor/generator 40. The third embodiment is otherwise similar to the first embodiment, but with a significant reduction in component cost. Some simultaneous operations will need to be compromised, but this will be compared to the cost reduction trade off.

Figure 4:
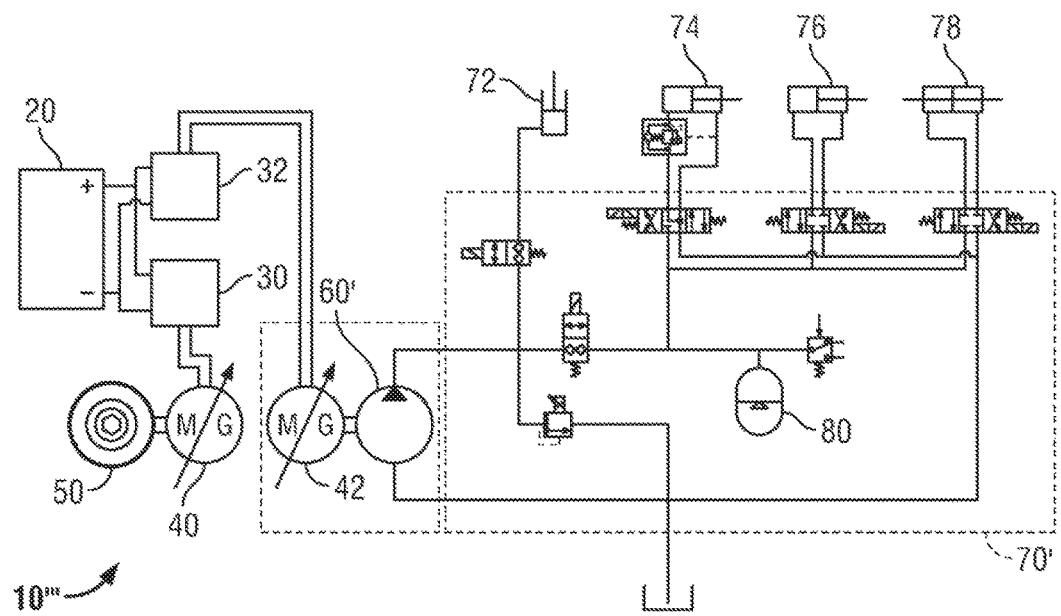
FIG. 4 illustrates a fourth exemplary schematic embodiment of a system constructed in accordance with the present invention—the system utilizing two motor/generators and at least two hydraulic pump/motors.

In FIG. 4, another embodiment is shown which saves battery power consumption by re-generating kinetic energy and using this energy to drive either the traction or hydraulic implement motors. The advantage is to keep the motors running in their most optimum torque and speed curve and to balance out the peaks and troughs of the overall power demand from the battery. The most efficient energy recovery is by either transferring the recovered electrical energy directly to the opposite motor drive, or if this motor does not need additional power use this to run the hydraulic pump to charge the accumulator. This approach will yield an overall power consumption benefit. An additional advantage is to reduce the size of the main power components (battery motor & drive).

Figure 5:
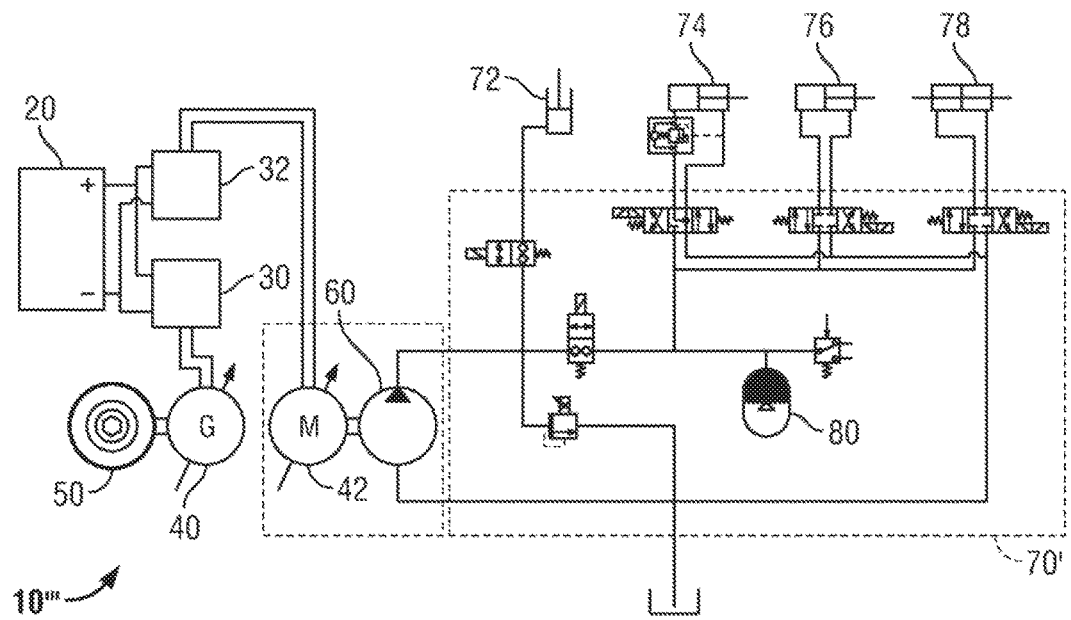
FIG. 5 is the system of FIG. 4 showing a first operating condition of the system.

The system of FIG. 4 is shown in operational conditions in FIGS. 5-8. In FIG. 5, the motor draws energy from the battery to run the pump at the optimum speed to charge the accumulator (during transport mode). Any brake energy can be used to generate electrical power and avoid the need to draw power from the battery. The accumulator is sized to operate the tilt reach and side shift cylinders during the normal operating cycle, the pump flow can also be used to assist if required.

Figure 6:
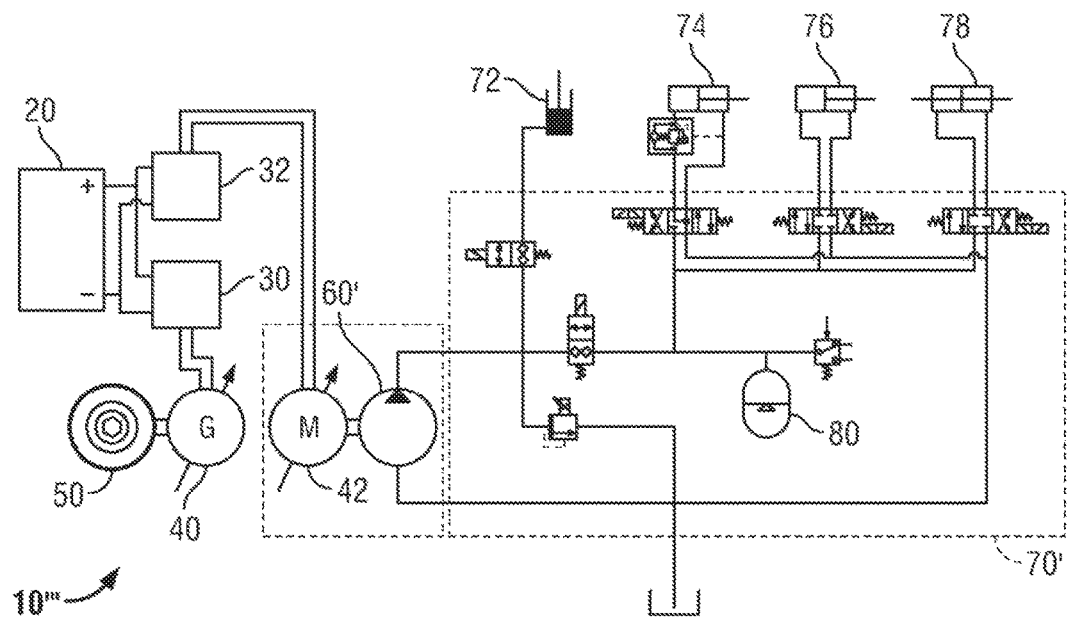
FIG. 6 is the system of FIG. 4 showing a second operating condition of the system.

In FIG. 6, during lifting, brake energy generated by the traction motor can be used to assist the hydraulic motor, and again reduce the current draw from the battery. Speed and fork position control is achieved by varying the motor speed.

Figure 7:
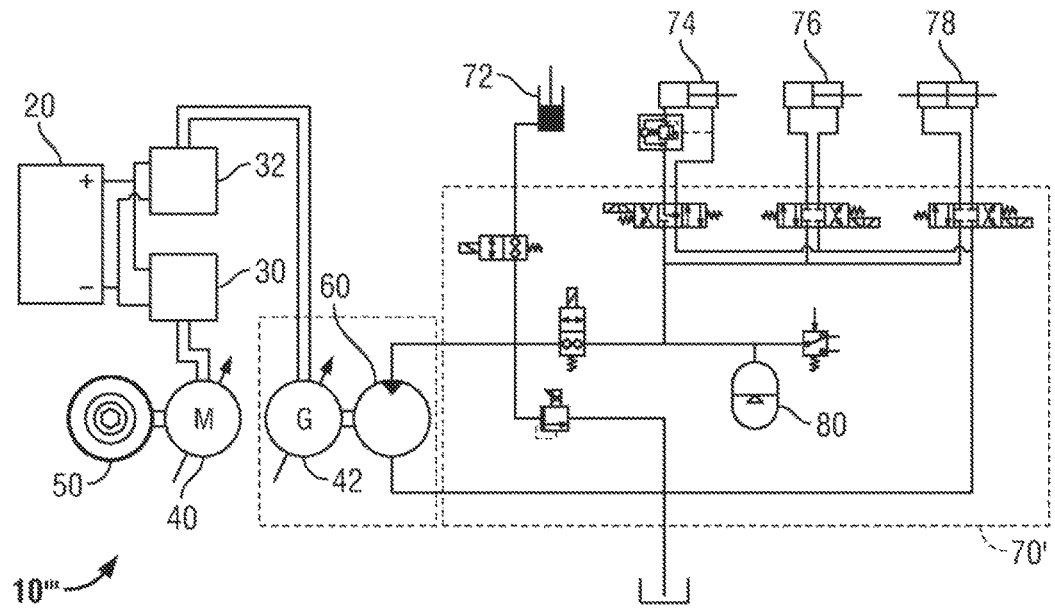
FIG. 7 is the system of FIG. 4 showing a third operating condition of the system.

In FIG. 7, for gravity lowering with no weight on the forks we can by-pass oil to the tank via the proportional RV. To slow the cylinder we ramp the RV pressure and drive the pump to generate electricity. This can assist the traction motor drive, and avoid current draw from the battery. With a heavy load more energy is recovered, while speed and fork position control is achieved by varying the motor speed.

Figure 8:
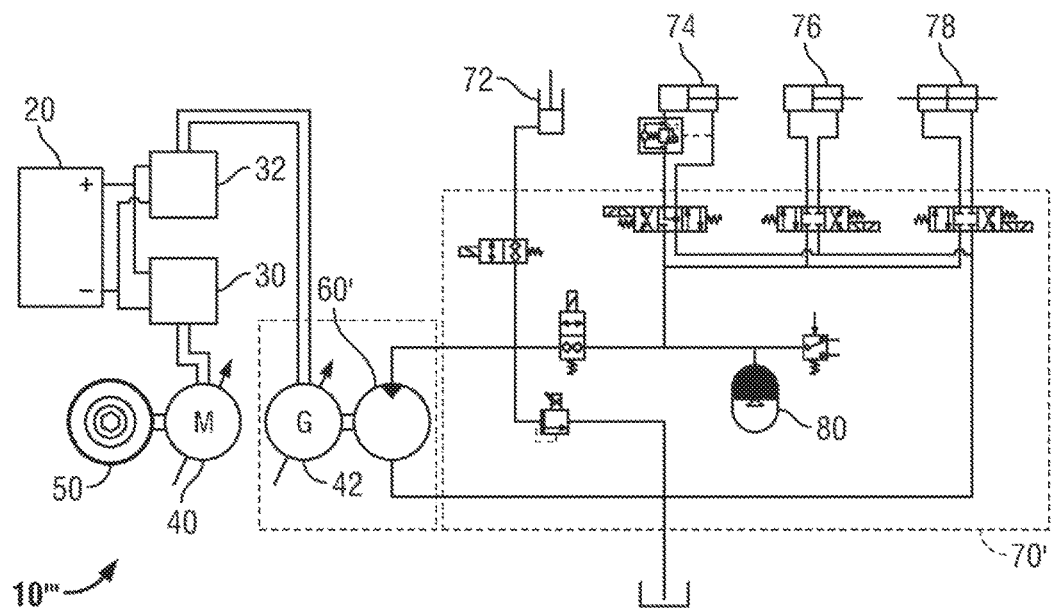
FIG. 8 is the system of FIG. 4 showing a fourth operating condition of the system.

In FIG. 8, the accumulator can be used to drive the pump motor to generate power to assist the traction drive during acceleration, and again reduce power consumption from the battery. Reach, tilt, and side shift functions are normally operated by the accumulator, as this is more efficient, and allows simultaneous operation during lift and lower.

Although not shown, a disk brake may be utilized for auxiliary braking and to act as a parking brake. A fail-safe interlock can be utilized for the disk brake if no driver is at the cab/seat.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A lift truck comprising:
   an electrical system comprising an electric power supply and an electric motor-generator connected to a drive train of the lift truck; and
   a hydraulic system for causing lifting of and additional auxiliary movements of a lift of the lift truck, the hydraulic system including a hydraulic pump/motor, a main hydraulic actuator configured to raise and lower the lift, and one or more auxiliary hydraulic actuators configured to cause the additional auxiliary movements of the lift;
   wherein the hydraulic system is configured to selectively redirect hydraulic power from the main hydraulic actuator to hydraulically power the one or more auxiliary actuators without redirection of said hydraulic power first to the hydraulic pump/motor.

2. The lift truck of claim 1, wherein the hydraulic system further includes a hydraulic accumulator.

3. The lift truck of claim 2, wherein the hydraulic system includes another motor-generator connected to the hydraulic pump/motor and arranged such that hydraulic power stored in the hydraulic accumulator may be converted to electrical energy.

4. The lift truck of claim 3, wherein the electrical energy generated from the hydraulic accumulator may be selectively directed to the electric motor-generator of the electrical system to provide motion to the drive train and/or to charge the battery.

5. The lift truck of claim 1, wherein the electric motor-generator is configured to convert kinetic energy from the drive train to electrical energy and is connected to the hydraulic system such that said electrical energy may be converted to hydraulic power via the hydraulic pump/motor.

6. The lift truck of claim 5, wherein the electrical power supply is a battery and said electrical energy converted from the drive train may be selectively used to charge the battery.

7. The lift truck of claim 1, wherein the hydraulic system includes another motor-generator connected to the hydraulic pump/motor and an inverter drive connected to the another motor-generator of the hydraulic system.

8. The lift truck of claim 1, further comprising an inverter drive connected to the electric motor-generator of the electrical system.

9. The lift truck of claim 1, wherein the electric motor-generator of the electrical system is connected to a traction drive, and is configured to apply a braking force to the lift truck and to convert the kinetic energy generated during said braking to electrical energy.

10. A lift truck comprising:
a battery;
an inverter drive electrically connected to the battery and connected to a first motor/generator, a traction drive/brake coupled to the first motor/generator;
a second inverter drive electrically connected to the battery and connected to a second motor/generator; and
a hydraulic pump/motor coupled to the second motor/generator and hydraulically connected to a hydraulic lift circuit for causing lifting of and additional auxiliary movements of a lift of the lift truck, the hydraulic lift circuit including a main hydraulic actuator configured to raise and lower the lift, and one or more auxiliary hydraulic actuators configured to cause the additional auxiliary movements of the lift;
wherein hydraulic power from actuation of the main hydraulic actuator is selectively redirected to hydraulically power the one or more auxiliary actuators without redirection of said hydraulic power first to the hydraulic pump/motor.

11. The lift truck of claim 10, wherein hydraulic power from actuation of the main hydraulic actuator is alternatively selectively converted into electrical power and stored in the battery or converted into torque to move the lift truck.

12. The lift truck of claim 10, wherein kinetic power from the traction drive/brake is converted to electrical energy and is selectively stored in the battery or further converted to hydraulic power and used to actuate the main hydraulic actuator.

13. The lift truck of claim 12, wherein the hydraulic lift circuit further includes a hydraulic accumulator, and wherein electrical power converted from the traction drive/brake is alternatively selectively converted into hydraulic power and stored in the accumulator.

14. The lift truck of claim 10, wherein the hydraulic lift circuit further includes a hydraulic accumulator, and wherein hydraulic power from actuation of the main hydraulic actuator is alternatively selectively stored in the accumulator.

* * * * *